United States Patent [19]

Tsingopoulos

[11] Patent Number: 5,217,723
[45] Date of Patent: Jun. 8, 1993

[54] APPARATUS FOR THE PRODUCTION OF REINFORCED FLEXIBLE HOSES

[75] Inventor: Dimitris Th. Tsingopoulos, Athens, Greece

[73] Assignee: Tetragon, S.A., Athens, Greece

[21] Appl. No.: 709,453

[22] Filed: Jun. 3, 1991

[51] Int. Cl.$^5$ .............. B29C 47/06; B29C 47/52; B29C 47/90
[52] U.S. Cl. .............. 425/113; 425/131.1; 425/383; 425/392
[58] Field of Search .......... 425/113, 131.1, 380, 425/382.3, 392, 402, 383, 381, 393

[56] References Cited

U.S. PATENT DOCUMENTS

| | | | |
|---|---|---|---|
| 3,395,205 | 7/1968 | Petzetakis | 425/392 |
| 3,605,189 | 9/1971 | Bauman et al. | 425/113 |
| 3,642,396 | 12/1972 | Meneidis | 425/113 |
| 3,642,982 | 12/1968 | Petzetakis | 425/113 |
| 4,033,808 | 7/1972 | Petzetakis | 156/425 |
| 4,157,235 | 6/1979 | Lagabe et al. | 425/392 |

Primary Examiner—Willard Hoag
Attorney, Agent, or Firm—McAulay Fisher Nissen Goldberg & Kiel

[57] ABSTRACT

Apparatus for the production and proper calibration of improved flexible hoses made by a soft thermoplastic material reinforced with a continuous spiral of rigid thermoplastic material. During their production the hoses do not rotate but are produced linearly and in their internal surface no longitudinal grooves are engraved. The melted coaxial materials are discharged through a rotating mechanism to a calibration unit which rotates with it and bears peripherally special inclined rollers on which is transmitted, via an epicyclic gearing system, a controlled rotation opposite to the above direction. On this calibration unit the plastic hose is formed successively, advancing linearly forward.

19 Claims, 1 Drawing Sheet

APPARATUS FOR THE PRODUCTION OF REINFORCED FLEXIBLE HOSES

FIELD OF THE INVENTION

The present invention relates to apparatus for the production of flexible hoses made by a soft thermoplastic material reinforced with a continuous spiral of rigid thermoplastic material.

BACKGROUND OF THE INVENTION

For many years, two principal methods were common for the production of flexible hoses made by soft thermoplastic material reinforced with a continuous spiral made by a rigid thermoplastic material. The materials which are used for these hoses are mainly the combination of soft (plasticized) and rigid PVC. The calibration of the soft PVC at the specified dimension by the usual methods is very difficult because this material behaves as a viscous glue at the processing temperatures. On the other hand this property of the plasticized PVC, which under the normal environment conditions behaves generally as a rubber, makes it incomparable for the creation of flexible hoses reinforced with a strengthening spiral from hard thermoplastic or metallic spiral, which is embodied in its mass consisting of the wall of the hose. This type of hose keeps their cylindrical form and presents a satisfactory resistance to the external and internal loads. Because of their flexibility they are very useful and almost non-replaceable for many applications such as the transport of water, petrol, beer, milk and many liquids, for the supply or absorption of air, absorption of industrial gases, powders etc., and further for transportation of gravel, dry seeds etc., protection and additional external isolation of electric cables any many other special applications.

According to the first method of production, which was invented by Arist. Petzetakis, see Greek patent No 22347/13th of Oct., 1961, a simultaneous coextrusion of the two materials, soft and rigid PVC is made, with the soft material surrounding the rigid material. Through a special head, the produced composite "cord" is wound around a special calibration unit, which gives the produced hose the desired diameter. As this "cord", which is composed by the two melted plastic materials, comes in contact with the wall of the already formed plastic hose, it sticks on it, forming an endless spiral. As indicated above, the adhesive soft material surrounds the corresponding rigid portion, so actually, the soft material is the one that comes in continuous contact with the corresponding soft material of the last spiral of the already formed hose and, by continuous welding, forms the hose. In this way the advantageous weldability of the soft PVC and other soft plastic material is completely exploited. However, because of the above required property, the melted soft PVC also sticks easily on the material of the necessary calibration unit, thereby not permitting the creation of a hose with satisfactory quality. To avoid this problem, a special calibration unit is used in connection with this method wherein the produced hose while it is pulled away with the help of a haul-off machine, laying post the production line.

By this method the hose is produced linearly (does not rotate during production), the required area is small and there is no limitation to the produced length. However, the hoses produced by this method have a serious disadvantage relating to the quality of their internal surface. Anybody can easily observe the deep longitudinal grooves, known as tape marks, on their entire internal surface, which sometimes wound even the reinforcing rigid plastic spiral.

These internal grooves constitute lines of inferior strength, when subjected to internal or external loads. Also, they reduce the impact strength of these hoses especially at low temperatures. Furthermore, these grooves attract the inhabitance and the development of parasites, bacteria and various microbes, which restricts their usage for foodstuff applications.

According to the second production method, which was developed by the japanese SHIRO-KANAO, patent No SHO 35-7629, the two plastic materials, soft and rigid, are also coextruded with the soft material surrounding the rigid one. The produced composite "cord" is led tangentially to a special calibration unit, which consists of a series of peripheral rollers, which are held as a cantilever on an immobile basement. These rollers are disposed at an inclination to the central axis of the calibration unit and can be rotated with the desired speed via motor and a gearbox.

This roller rotation is transmitted to the tangentially fed melted plastic "cord" which is thus pushed towards the exit of the calibration unit. The contact of the soft sticky plastic with the rotating rollers is instantaneous, as they are rolling under it, and its adherence to them is avoided. At the same time, the external surface of the melted soft plastic comes in contact with the corresponding, still in melted stage, lateral surface of the already formed hose, which is still on the calibration unit, sticks to it and forms the new spiral of the produced flexible hose.

As it is easily perceptible, hose produced by this method rotates during its production around its axis, which at the same time is the central axis of the calibration unit. This rotation is transmitted from the rotating peripheral roller to its internal surface as it comes successively in contact to each one of them and the produced hose cools down, shrinks and is tightened on them.

With this method, a successful production of flexible plastic hoses is also achieved. Internally, the produced hoses have a smooth surface and they do not have the detrimental longitudinal grooves of the preceding method. However the disadvantage of this method is the obligation to continuously rotate the flexible plastic hose during its production. This problem becomes more apparent a the hose diameter is smaller. The continuous trouble-free rotation of, for example, three hundred feet of a flexible plastic hose, specially while this rotary motion is exerted to its one and which is still hot, is not a stable process. Any slight disturbance would cause problems at the hose generation area. Furthermore the total floor length required for such a production line is big and relative to the needed length of the hoses. The required marking on the hose's surface is not possible to be done at the same time as the hose is produced due to its rotation. Neither is its simultaneous winding in coils possible. These procedures have to be executed in a second stage, which affects the production cost accordingly.

Less used is a variation of the second method of production. According to this method, ACHENBACH, the produced coaxial plastic "cord" is initially cooled-down and then is fed tangentially to a relatively short rotating conical calibration unit. There, the lateral sides of the "cord" and the already formed hose are heated intensively to melt, with the aim of hot air and, immediately after they are fused together with the additional help of local compression.

This method, like the preceding one, has the disadvantage of the obligatory hose rotation during its production. Beyond this, the hoses produced by this method hoses contain internal stresses in their wall, due to the cold winding of the plastic "cord". These stresses negatively affect the hose's properties.

SUMMARY OF THE INVENTION

The subject of the present invention is to give a new improved apparatus for the production and the proper calibration of improved flexible plastic hoses reinforced helically with a continuous spiral of rigid plastic material, which will combine all the advantages of the existing relative methods and will overcome their disadvantages.

As usual, the two used material, soft and rigid, are coextruded by two different extruders, being under a certain angle, into one distributing head formed in such a way so the soft material surrounds the rigid plastic and, at its exit, ejects a stream of melted soft plastic, usually plasticized PVC, which bears internally a coaxial continuous cord of melted rigid plastic. Next, this two-part stream enters in a "head assembly" which is actually a planetary gearbox and will be referred from now on as "head". This "head" holds internally a major rotating part which will be referred from now on as "rotor". This "rotor" has internally a channel through which is flowing the said two-part stream of melted plastics. At its exit, this channel ejects the said stream of coaxial melted plastics, with the soft material surrounding the rigid, as a "cord" and deposits it, while the "rotor" rotates via a rotating means, on a special calibration unit which has on its external surface an array of special peripheral rollers seated under an angle relative to its central axis. These rollers may be either flexible, metallic or made of a special plastic which resists heating at the processing temperatures, or, non-flexible. Their shape may be cylindrical, conical, spherical, barrel or any combination or cascade of those and their length may be equal or different than the effective length of the calibration unit.

The entire calibration unit is matched (adapted) on the "rotor" and rotates with it around their common imaginary longitudinal axis. In this way, the position of any specified point of the calibration unit relative to a certain point or the "rotor", e.g. the center of the channel's exit where the melted "cord" is ejected, is fixed. At the same time, via the planetary system of gears, a revolving motion is transmitted to each one of the peripheral rollers with a direction of rotation opposite to the direction of the rotation of the system "rotor - whole calibration unit".

An external observer sees the system "rotor - calibration unit" to be rotating, around their imaginary longitudinal axis, on a certain direction, e.g. clockwise. The peripheral rollers whose axes are spaced at equal distances from the imaginary axis perform simultaneously two rotary motions. The one is identical to the rotation of the system "rotor - whole calibration unit", of which they are members, around the imaginary axis (clockwise). The second rotation of each of them is around its own axis of symmetry, at the opposite direction to the previous one (anti clockwise). As the melted "cord" is ejected, during the hose production, onto the external surface of the rollers of the calibration unit, they exert to it two separate rotations. One of them is caused by the rotating calibration unit, bearing on it the rollers, around its longitudinal imaginary axis (clockwise in our example). The second rotation is caused by the individual rotation of each one of the rollers and has an opposite direction the previous one. The resultant rotation of the produced hose is the algebraic sum of the above two rotations.

With proper selection of the characteristics of the various gears of the "head" as well as the diameters of the rollers relative to the external peripheral of the calibration unit, or with the incorporation of an additional external adjusting rotating motion, the two peripheral speeds of the produced hose can coincide resulting an algebraic sum equal to zero. This means linear production of the hose with not any rotation. The forward movement of the produced hose is effected due to the said inclination of the said peripheral rollers relative to the longitudinal imaginary axis of the calibration unit and is proportional to the angle of this inclination. The side of the melted "cord" is easily fused on the still melted side of the last spiral of the already formed hose on the calibration unit. Its internal surface is not damaged as the rotating rollers are rolling on it and each part of their circumference comes in an instantaneous contact with it. With this continuous internal "ironing", a very smooth internal surface is provided on the hoses produced by the present disclosure.

In accordance with the present invention, as analytically described, the production of improved flexible plastic hoses reinforced with a rigid plastic spiral is achieved. During their production there is no formation of any longitudinal engravings (grooves). They have a smooth internal surface, there is no requirement for rotation during their production and there is no restriction to the production of long continuous lengths, to their marking on-line during production or to their on line winding in rails. Additionally, the floor space required for the production line is relatively small and does not depend on the length of the produced hoses.

DESCRIPTION OF THE PREFERRED EMBODIMENTS

Figure 1:
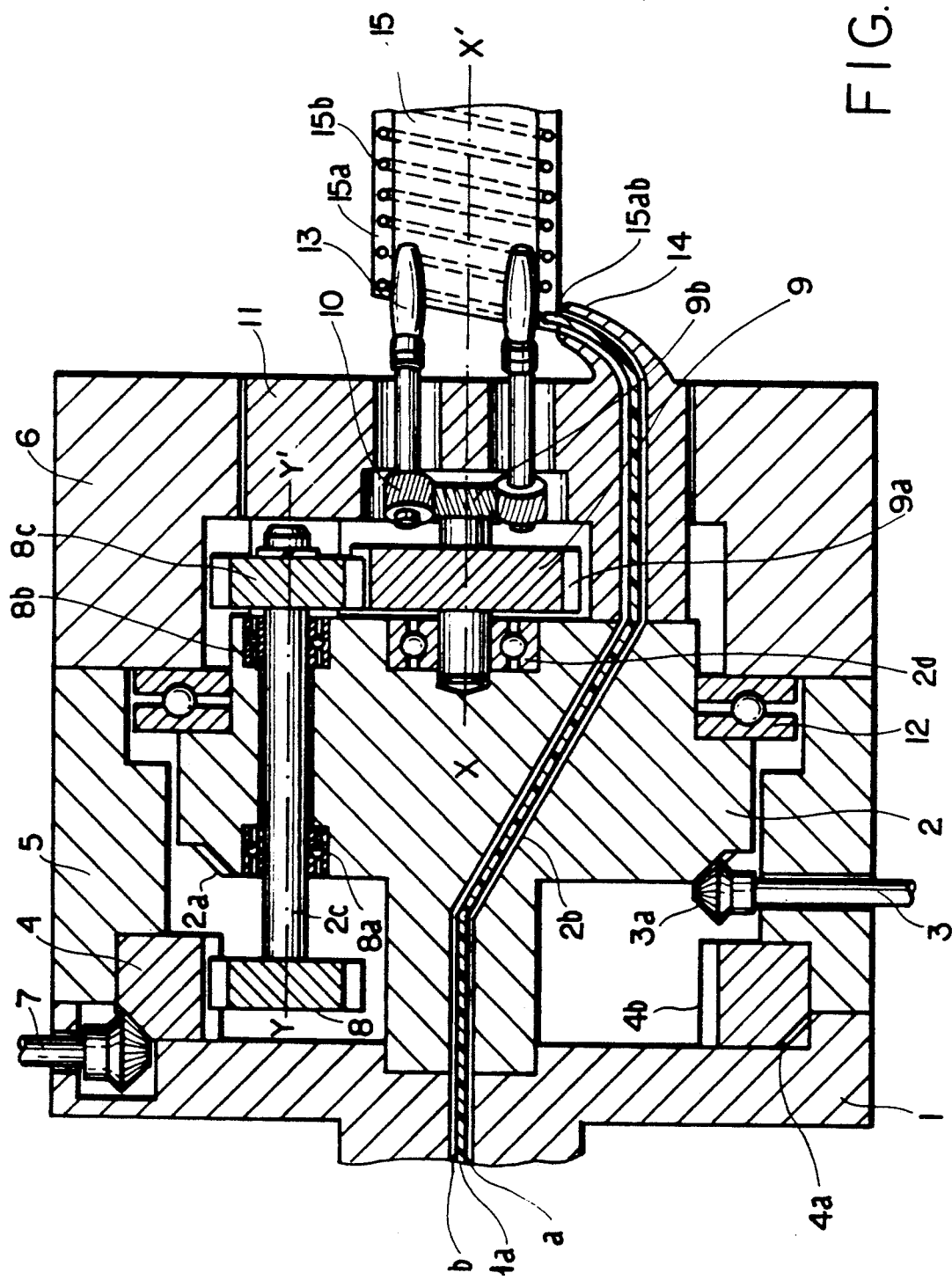
FIG. 1 illustrates as an example, a longitudinal section of the preferred embodiment for the production of improved flexible plastic hoses of the present invention.

Referring to the figure, At the point 1a of the piece No 1 of the apparatus are fed coaxially in melted condition the soft material a and the rigid material b, provided by two different extruders which are not shown. After that, they enter the channel 2b of the rotating part 2 named previously as "rotor". With gear 3a, of the transmission system 3, a rotary motion is transmitted to the "rotor" 2 through the teeth 2a.

Rotor support at the piece 6 is succeeded by the bearing 12. Piece 6 is fixed (bolted) at the housing 5. Pieces 1, 5 and 6 constitute the immobile parts of the apparatus.

Piece 4 may be immobile or rotating at the desired direction through the motion transmission system 7 and the teeth 4a. The support of piece 4 is performed in the opening formed by the fixed together pieces 1 and 5 which may also constitute one piece.

Internally piece 4 has gearing 4b which transmits constant or controlled motion to the planetary gear B which is also forced by the "rotor" 2 to rotate around the imaginary axis x-x'. The first rotational motion of gear B is transmitted through its axis 2c, supported by bearings 8a and 8b to the "rotor" 2, to the gear 8c.

It is clear that when piece 5 is immobile, then the rotating direction of planetary gears 8 and 8c around their common axis y-y', is opposite to the direction of rotation of the "rotor" 2 on which they are attached.

Piece 9 is supported t the "rotor" 2 through the bearing 2d. Externally it has gearing 9a which collaborate with the planetary gear 8c which forces it to rotate around its axis x-x', at the same direction of rotation to the "rotor" 2. This rotary motion is further transmitted from the gearing 9b to the peripheral (planetary) gears 10 which are supported at the piece 11 and forces them to rotate around themselves at an opposite direction.

Piece 11 is fixed at the "rotor" 2 together which rotates around their common axis x-x', causing the gears 10 and the rollers 13 to execute their second rotary motion. Pieces 11, 10 and 13 constitute the calibration unit.

From the ejection point 14 the "cord" 15ab submerges, composed of the melted materials a and b, (the material a surrounds completely the material b). Further, as the hose 15 is formed, they constitute its wall, 15a the soft material and 15b the rigid material.

Although an exemplary embodiment of the present invention has been shown and described, many changes, modifications and substitutions may be made by one having ordinary skill of the art without necessarily departing from the spirit and scope of this invention.

What is claimed is:

1. In an apparatus for the production and calibration of a flexible plastic hose formed by the process of coiling a rigid thermoplastic material encased in a melted thermoplastic material, the improvement comprising:
    (a) transmission means; and,
    (b) a head assembly comprising:
        (1) a rotor having a longitudinal axis and a channel within said rotor for transporting the rigid thermoplastic material encased in the melted thermoplastic material, said channel having an eccentric exit, said rotor being rotatable within said head assembly by said transmission means; and,
        (2) a calibration unit attached to said rotor for forming a uniform internal wall within the plastic hose, said unit comprising an array of rollers, said array having an outer circumference, the soft and rigid thermoplastic materials being discharged through said eccentric exit onto said outer circumference, said outer circumference forming the inner wall of the hose, said rollers being inclined to a common central axis and each of said rollers having an individual axis of rotation.

2. The apparatus of claim 1 wherein the inclination of said rollers are fixed.

3. The apparatus of claim 1 including means for regulating the inclination of said rollers.

4. The apparatus of claim 1 wherein said rollers are flexible.

5. The apparatus of claim 1 wherein said rollers are rigid.

6. The apparatus of claim 1 wherein said rollers have an internal supporting shaft.

7. The apparatus of claim 1 wherein said rollers are without an internal supporting shaft.

8. The apparatus of claim 1, wherein said calibration unit further comprises means for rotating said rollers about their individual axes of rotation, said means rotatably connecting said rollers to said transmission means for rotating said rollers in a direction opposite to said rotation of said rotor for preventing rotation of the hose and for linearly advancing the hose.

9. The apparatus of claim 8 which further comprises means for externally compressing the thermoplastic coiling to improve the external surface.

10. The apparatus of claim 9 wherein the means for compressing includes at least one external roller.

11. The apparatus of claim 10 wherein said external roller is an idler roll.

12. The apparatus of claim 10 wherein said external roller is connected with monitor controlling rotation.

13. The apparatus of claim 1, said calibrating unit having a first peripheral speed of rotation and said rollers having a second peripheral speed of rotation, wherein said second peripheral speed counteracts said first peripheral speed and prevents rotation of the hose.

14. The apparatus of claim 13 wherein said means for rotating said rollers includes an epicyclic gearing system having sun and planetary gears which do not interfere with the transportation and discharge of said thermoplastics onto said outer circumference to form the flexible hose.

15. The apparatus of claim 14 wherein said gears and diameters of said rollers are preselected in relation to hose diameter to cause said second peripheral speed to counteract said first peripheral speed to prevent rotation of the hose.

16. The apparatus of claim 14 including means for regulating said epicyclic gearing system to cause said second peripheral speed to counteract said first peripheral speed to prevent rotation of the hose.

17. The apparatus of claim 13 wherein said means for rotating said rollers includes an epicyclic gearing system having chain sprockets and chains which do not interfere with the transportation and discharge of said thermoplastics onto said outer circumference to form the flexible hose.

18. The apparatus of claim 17 wherein said sprockets and the diameters of said rollers are preselected in relation to hose diameter to cause said second peripheral speed to counteract said first peripheral speed to prevent rotation of the hose.

19. The apparatus of claim 17 including means for regulating said epicyclic gearing system to cause said second peripheral speed to counteract said first peripheral speed to prevent rotation of the hose.

* * * * *